United States Patent [19]
Kump et al.

[11] Patent Number: 5,788,719
[45] Date of Patent: Aug. 4, 1998

[54] METHOD FOR MAKING LEAD-ACID JARS AND CELLS

[75] Inventors: William H. Kump, St. Paul; Jeffrey M. Henning, Eagan, both of Minn.

[73] Assignee: GNB Technologies, Inc., Mendota Heights, Minn.

[21] Appl. No.: 741,908

[22] Filed: Oct. 31, 1996

[51] Int. Cl.⁶ .................................................. H01M 2/02
[52] U.S. Cl. .................. 29/623.2; 429/176; 429/187
[58] Field of Search ............................ 429/175, 176, 429/185, 187, 204, 225, 163; 264/500, 527, 531; 425/522; 29/623.1, 623.2; 220/696; 206/703

[56] References Cited

U.S. PATENT DOCUMENTS

| | | | |
|---|---|---|---|
| 1,922,082 | 8/1933 | Dunzweiler | 429/176 X |
| 3,298,870 | 1/1967 | Sabatino | 429/185 |
| 3,698,961 | 10/1972 | Niemann | 429/185 |
| 3,993,507 | 11/1976 | Hardigg | 429/176 |
| 4,107,402 | 8/1978 | Dougherty et al. | 429/176 X |
| 4,118,265 | 10/1978 | Hardigg | 429/176 X |
| 4,732,826 | 3/1988 | Hardigg | 429/176 |
| 5,240,788 | 8/1993 | Eales | 429/156 |
| 5,492,779 | 2/1996 | Ronning | 429/176 X |

*Primary Examiner*—Anthony Skapars
*Attorney, Agent, or Firm*—Leydig, Voit & Mayer, Ltd

[57] ABSTRACT

A method for making a family of lead-acid cells requiring a constant width, a height varying from a maximum to a minimum to accommodate plates of varying height and a cell depth to accommodate a minimum to a maximum number of plates is disclosed which utilizes blow molding to form a jar precursor which is cut to the height desired, and, in its preferred aspects, including use of a mold and insert sets which simplify tooling and change-over time, as well as a cover and jar design which simplifies the heat sealing of these components.

11 Claims, 4 Drawing Sheets

METHOD FOR MAKING LEAD-ACID JARS AND CELLS

FIELD OF THE INVENTION

This invention relates to lead-acid cells and batteries and, more particularly, to jars used in making such cells and batteries and to the method of making such grids and plates.

BACKGROUND OF THE INVENTION

A wide variety of applications, often termed "industrial battery"0 applications, utilize conventional, flooded electrolyte lead-acid cells and batteries, or sealed lead-acid cells and batteries, often term VRLA cells and batteries ("valve-regulated lead-acid"). In stationary battery applications, the lead-acid cells and batteries provide stand-by power in the event of a power failure. For this type of application, such cells and batteries are maintained at a full state-of-charge and in a ready-to-use condition, typically by floating at a constant preset voltage. Stationary batteries are used for stand-by or operational power in a wide variety of applications, including, by way of illustration, telecommunications, utilities, for emergency lighting in commercial buildings, as stand-by power for cable television systems, and in uninterruptible power supplies for computer back-up power and the like.

Other applications in which lead-acid cells and batteries may be used involve a variety of motive power applications in which an array of cells or batteries provides the motive power for vehicles ranging from Class 1 to Class 3 trucks, various automated guided vehicles, mining vehicles and also railroad locomotives. The performance requirements for motive-power vehicles are quite different from the performance requirements for stationary power sources. In stationary power applications, the depth of discharge in service is relatively shallow, and the number of discharges is smaller, as most batteries are in float service. In direct contrast, motive power applications require a relatively deep depth of discharge to be achieved on a continuous cycling basis over a period of time. Indeed, a common requirement for Class 1-3 trucks is that, in an 8-hour shift, the cell or battery assembly must be capable of delivering an 80% depth of discharge and that performance is required for 300 cycles per year with a useful service life under those conditions of 4 or 5 years.

The widely varying requirements for these many applications has presented substantial problems to manufacturers of lead-acid cells and batteries. These requirements have presented an extremely challenging environment for lead-acid cell and battery manufacturers. This environment has resulted in, to a large extent, custom designs which satisfy particular applications.

As a consequence, lead-acid cell/battery manufacturers have had to develop families of cells and batteries in an attempt to satisfy the diverse electrical performance criteria. Such criteria vary widely, often requiring large cells connected in parallel, series, or both, to provide a satisfactory power/energy source.

The space requirements often are also quite constricted, with closely defined dimensional requirements. Many types of steel trays and the like are used.

To achieve the family of cells and batteries requires grids of various sizes so that the capacity and other electrical performance requirements for an individual cell for a particular application can be satisfied. One approach utilized has been to provide a series of grids having essentially constant width while varying the height of an individual grid and the number of plates used in a particular cell to achieve a variety of capacity and other electrical performance requirements.

The inventory and manufacturing requirements to provide the necessary family of cells are difficult to satisfy. Molding tool costs can become excessive. Changeover time from one size to another can detract significantly from desired productivity.

One attempt to minimize the tooling required involves injection molding two halves which are then heat-sealed together, the seal extending down both sides and across the cell, to provide the cell container (often termed a "jar"). In this fashion, jar halves may be injection molded in varying lengths while the other dimensions remain the same, thereby accommodating a variety of plate sizes each of which have a constant width, simply by varying the height of the jar.

While simplifying the tooling requirements, yet producing a family of lead-acid cells, the heat sealing step required can present problems. More particularly, not only does this involve extra steps, increasing the manufacturing cost, this heat sealing operation provides a potentiality for creating areas where electrolyte leakage could possibly occur. Additionally, the heat sealing operation can release molded-in stress which causes distortion of the jar walls and resulting in an out-of-square jar. Such out-of-square jars do not satisfactorily match the cover heat seal channels typically used in an automated operation in assembling the cover and jar, resulting in potential cover leaks and the like. Even further, the resulting heat seal beads on the jars require flattening for cosmetic and other reasons, but such flattening operations still often result in unduly thick heat seal bead section.

Still further, in the steel trays often used to house the many cells typically required, such trays require use of jars having uniform outer dimensions. Achieving such uniformity typically requires eliminating the heat seal beads resulting from sealing the cover to the jar to provide the desired outer dimensional uniformity.

Additionally, as previously noted, the cells required for many applications are extremely large and quite heavy. It would be highly desirable to provide a jar that accommodates lifting of the cell by appropriate equipment while still satisfying the other criteria.

Blow molding technology is also known and suggested for various specific applications. U.S. Pat. No. 4,304,826 to Kendall thus discloses a motive power battery casing which is blow molded in an oblong configuration with a rectangular cross-section, as is shown in FIGS. 4a and 4b of the '826 patent.

U.S. 4,467,021 and 5,209,991 to Stocchiero show additional cell containers and lids using certain blow molding technology. The '021 Stocchiero patent concerns a configuration which is stated to solve the problems related to the trimming of a heat sealed bead which forms itself on the inside and not on the outside of the cell container. This improvement, it is stated, was made possible by two factors and precisely by (1) the particular conformation of the cell-lid and of the cell-container's rim provided with a male-female mating remaining with the standard overall-dimensions and (2) by the extremely reduced thickness of the cell-container's walls and that of the cell-lid's rim, reduced to more than a half in comparison to the ones generally used (col. 1, ll. 55–65). Blow-forming is used to form the cell-container, permitting extremely reduced thickness of the walls of the container in comparison to use of a thermoplastic molding process (col. 2, ll. 3–13).

The '991 patent to Stocchiero discloses a container for lead-acid batteries having essentially vertical walls with each wall having a plurality of internal and external perimetric recesses having the same pitch. These recesses are stated to permit the lengthening of the walls of the container when these walls are subject to traction. Advantageously, and according to the invention, it is stated that the production costs can be decreased by blow molding, as well as providing savings due to the lower production costs of the molds.

U.S. Pat. No. 5,135,823 and 5,240,788 to Eales disclose blow molded, multiple compartment plastic containers. These multiple compartment containers are said to be useful for applications such as bottles and the like, and/or multi-celled batteries, and multi-component products, including foods and non-edibles.

Despite all of the prior interest in various configurations using blow molding technology for specific lead-acid battery applications and the difficulties experienced in employing injection molding technology to satisfy the wide requirements for lead-acid cells, neither a methodology nor a satisfactory configuration has been proposed to solve these significant problems. Thus, despite all of this prior work, the problems discussed herein continue to exist.

It is accordingly a principal object of the present invention to provide commercially viable methodology for making jar precursors which can be used to make a family of jars of widely varying size to accommodate the requirements of various industrial cell/battery applications while simplifying the tooling and molding requirements.

A further object provides such a method which achieves a one-piece jar for lead-acid cells and not requiring any jar heat seals other than the cover-jar heat seal itself. A related and more specific object achieves such jars which are relatively free from distortion, thereby minimizing, if not eliminating, out-of-square jars that complicate the heat sealing operation of the cover to such jars.

Yet another object provides a one-piece jar having uniform wall thickness and the ability to alter the internal jar dimensions as desired.

A still further object provides a one-piece cell jar having structure which allows the cell to be readily lifted by automated equipment, yet which does not detract from the other criteria that must be satisfied.

Another object of the present invention provides a cover-jar design that satisfies the criteria described herein while simplifying the cover-jar sealing operation. A more specific aspect lies in the provision of a cover design which facilitates guiding the cover into proper alignment for such sealing operation.

Other objects and advantages of the present invention will become apparent as the following description proceeds. While the present invention will be described primarily with respect to use in sealed and flooded electrolyte lead-acid cells, the present invention can be advantageously used in any application for a single cell where a series of containers are needed to accommodate various cell sizes, regardless of the electrochemical system involved.

SUMMARY OF THE INVENTION

The present invention is, in general, predicated on the discovery that blow molding may be utilized in a selected fashion to achieve a family of jar sizes so as to significantly minimize manufacturing and inventory requirements. In general, common tooling is used to provide a one-piece jar precursor that can be cut to the height required to accommodate various applications while maintaining a constant jar width dimension and selecting a depth to accommodate the required number of plates. Still further, the outer dimensions can be maintained while reducing the internal dimensions, as necessary, to satisfy the desired plate-to-plate spacing, and, where appropriate, the level of compression necessary. A more preferred embodiment provides a jar having structure which allows the completed cell to be lifted, and moved as desired, by automated equipment and the like. Another aspect of the preferred embodiment comprises a cover and jar design which facilitates appropriate alignment for a heat seal operation while eliminating the need to undertake trimming or other operations to remove any heat seal bead which would provide a non-uniform outer cell dimension. Still further, by utilizing blow molds having inserts that allow the depth of the jar to be altered, the method of making a family of jar sizes is simplified. In this fashion, a wide variety of applications can be accommodated while requiring only a minimum of tooling and change-over time. The resulting jars likewise obviate the many potential problems resulting from multiple-piece jars.

DETAILED DESCRIPTION OF THE INVENTION

Pursuant to the present invention, the blow mold tooling used is sized to provide a maximum first height for the particular application. Then, the blow molded jar precursor is cut to a second height to make the jar to house the particular, preselected plates necessary to provide the desired electrical capacity. In this fashion, a family of cells may be provided having significantly varying electrical capacities, yet using a single mold. As illustrative examples only, many industrial applications utilize plates having heights ranging anywhere from about 12 inches to about 26 inches or so. In this example, the original size jar precursor would have the width and depth desired to fit the particular spatial and capacity requirements for the application, and the original height of the jar precursor would be sufficient to allow cutting to a jar accommodating plates having a height of 26 inches. The jar precursor is cut to provide the desired sized cell, i.e., cut in height sufficiently to accommodate plates down to 12 inches in height or even less. To this end, FIG. 1 shows the jar precursor 10 of the present invention having an original height, $H_1$, which is adequate to accommodate, after cutting to form the cell jar, the tallest plates desired for the family of cells.

According to a further aspect of the present invention, cell jar structure is desired to maintain the outer dimensions constant while decreasing somewhat the internal dimensions. More particularly, the space requirements, and thus the outer dimensions of a cell are often fixed, yet such fixed outer dimensions yield internal space for the cell element (i.e., the plates and separators) which is in excess of that required. However, for conventional flooded electrolyte cells, satisfactory performance requires satisfactory plate-to-plate spacing. The extra internal space often has been filled by using separators having a thickness greater than that which would be otherwise required for the application. The use of such separators has added significant additional expense and reduced performance, as well as not being a totally satisfactory solution.

Figure 1:
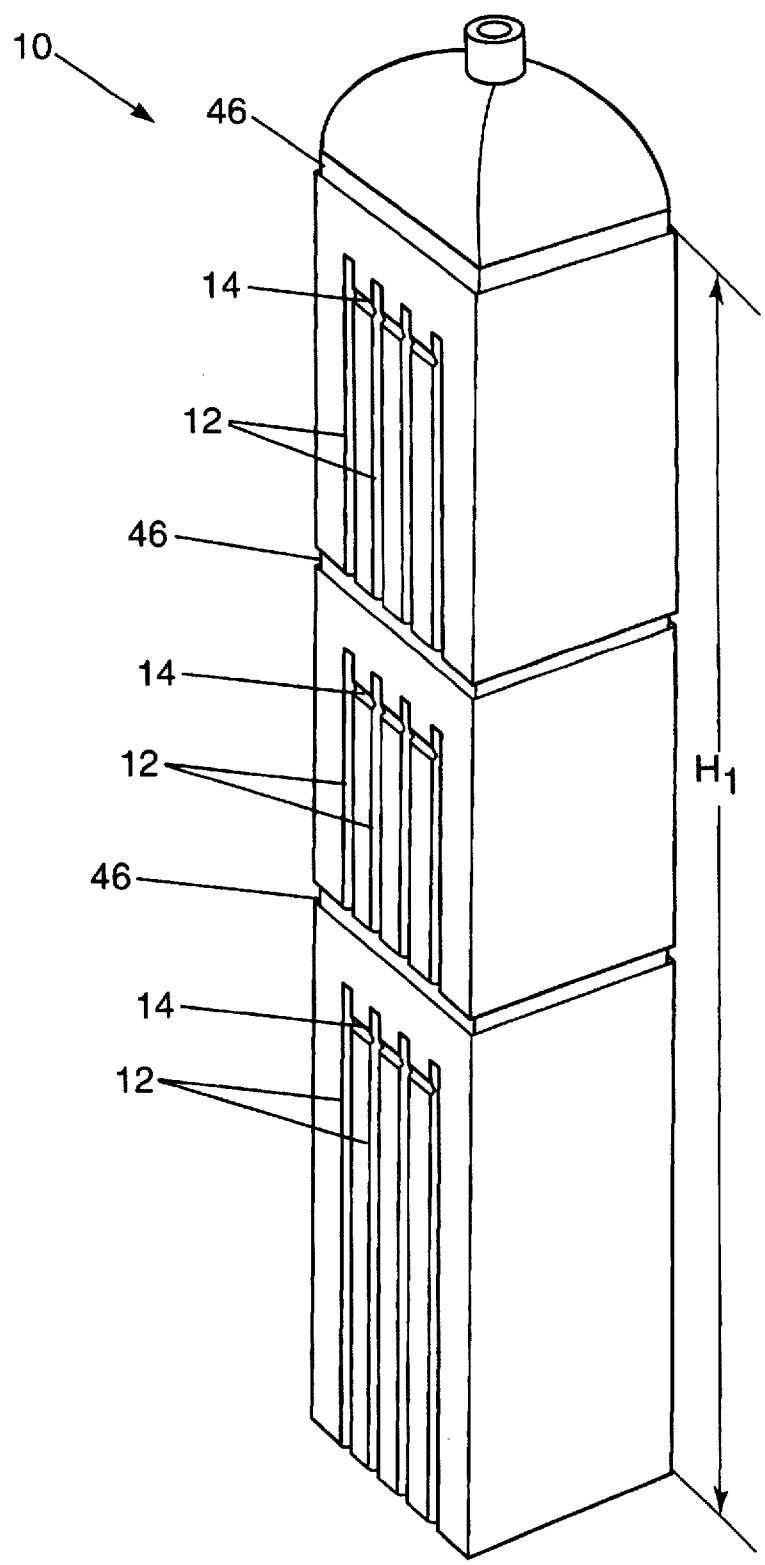
FIG. 1 is an isometric view of a jar precursor employed in the present invention, prior to being cut to the desired height for the particular cell jar.
Figure 2:
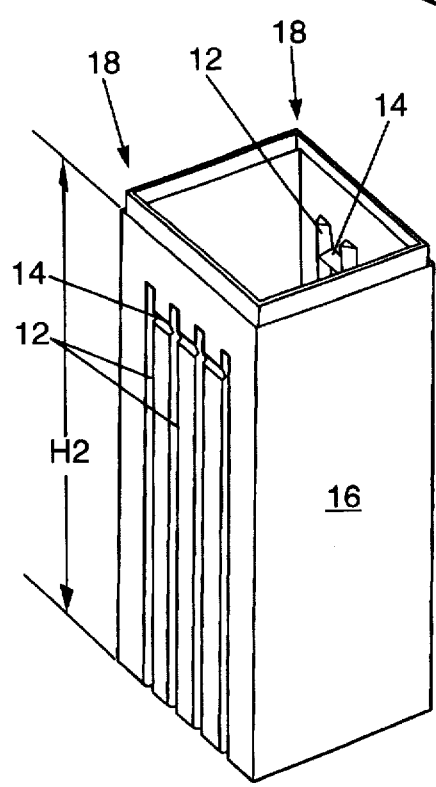
FIG. 2 is an isometric view of a cell jar cut from the jar precursor of FIG. 1.

To this end, and as is shown in FIG. 1, several series of spaced indentations 12 are provided along the height dimension of the jar precursor 10. These indentations 12 allow a uniform outer dimension to be maintained while providing a reduced depth for the cell element. Thus, as best seen in FIG. 2, the indentations 12 protrude into the cell. The extent to which the cell depth is reduced is determined by the desired thickness, or depth, of the cell element. In this fashion, satisfactory plate-to-plate spacing is achieved without the need to utilize excessively thick, and more expensive, separators.

Since the jar precursor 10 will be cut to the height desired for the necessary jar size, designated as $H_2$ in FIG. 2, the indentations 12 must be appropriately spaced along the height dimension of the two opposing jar walls defining the cell jar depth (i.e., the walls which are parallel to the plates) so that the desired location is retained after cutting the jar precursor to size. This may be achieved by molding in continuous indentations, or by having several separate series as is shown in FIG. 1.

Yet another aspect of the preferred embodiment of this invention includes internally disposed lifting ledges 14. Such lifting ledges 14 allow the assembled cell to be readily moved by automated equipment as desired.

The illustrative embodiment, as shown in FIGS. 1 and 2, locates the lifting ledges 14 on the jar walls also including indentations 12. It will, of course, be desirable to configure the lifting ledges 14 complemental to indentations 12 so as not to alter the desired plate-to-plate spacing. This requires that the inwardly extending lifting ledges 14 not extend into the cell depth past indentation 12.

Also, since jar precursor 10 will be cut to form cell jars 16 of different sizes, the utilization of lifting ledges requires provision of a series of such ledges located along the height dimension of the jar precursor walls defining the cell depth. In this connection, it may be preferred to utilize several series of indentations, rather than a continuous single series, in order to facilitate proper location for cutting to the various cell jar sizes. Stated differently, by using spaced series of lifting ledges and indentations, it becomes clear where the cuts should be made to provide the various sized jars.

The number of plates required for a jar of a selected height may vary anywhere from, for example, 7 to about 31 or more. Accordingly, tooling is needed to provide a jar depth to accommodate anywhere from 7 to 31 plates. Accommodating this widely varying cell size presents particularly difficult manufacturing and inventory concerns. This could require several different molds, each of which is relatively expensive, substantially increasing the necessary capital costs. Even further, the changeover time when a different mold needs to be put in place and used creates potentially significant productivity issues.

A still further aspect of the present invention thus utilizes a blow mold having a series of insert pairs that allow a single blow mold to be used, yet allow jars with greatly varying jar depths to be manufactured so that a minimum to a maximum number of plates can be accommodated. Pursuant to this feature, blow mold halves are provided with sets of insert pairs, each pair designed to yield a jar having the depth desired for a different number of plates.

Figure 3:
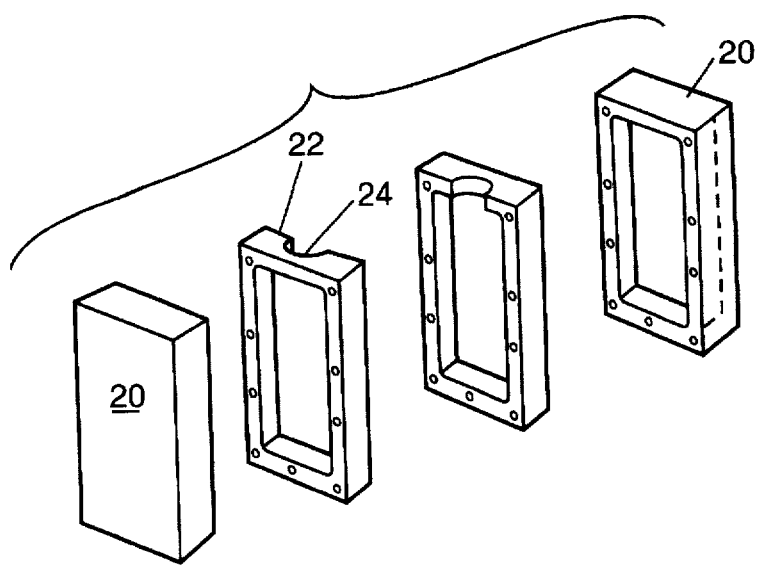
FIG. 3 is an exploded perspective view and illustrates a blow mold with inserts that further simplify the mold equipment needed to provide jars for a family of cells tailored to satisfy the criteria of a specific application.

Thus, as seen in FIG. 3, mold halves 20 and one insert pair 22, which together form the blow hole 24 that accommodates the parison tube (not shown), form the composite mold.

As may be appreciated, the mold halves may be used without such insert pairs, if desired. This may be desirable, for example, when the minimum jar depth is needed. Any blow hole in such molding halves could be closed off when the depth of the jar is such that inserts are used.

In this fashion, while maintaining a constant jar width and cutting the jar precursor height as desired for the cell jar, the cell depth may be varied to accommodate anywhere from a minimum number of plates to a maximum number of plates, simply by varying the size of the insert pair selected, i.e., with varying insert thickness, the mold depth is thereby increased. The expense associated with the use of the insert pairs is substantially less than the cost of providing a family of molds with varying depths, and changeover to provide a cell jar of a different depth is simplified. The inserts may thus be unbolted and removed and another insert pair attached, all without removing the mold halves.

As may be appreciated, the inserts 22 can be attached to the mold halves 20 by any suitable means, such as bolts or the like. Further, inserts 22 can be made with water cooling channels communicating with such channels used in the mold halves, as is known.

As may be appreciated, the insert thickness will be selected to provide the desired cell depth. As an illustrative example, the thickness of each insert may be about ⅜ inch to add two plates and ¾ inch to add four plates in comparison to the number plates in the base cell jar size. The number of plates that can be added in this fashion will be decided principally by the cooling requirements. Thus, up to a certain thickness, the inserts may be used without regard to supplementing the cooling efficiency of the composite mold. However, the use of thicker inserts to provide jars of greater depth may will require supplementing the cooling required for molding the particular jar, as by designing in water cooling, or bubbling channels into these thicker inserts.

Such constraints may make it more desirable, and perhaps necessary, to utilize more than one mold and a common set of inserts to provide cell jars accommodating the full range of the numbers of plates for the family of cell sizes (e.g., 7 to 31 plates). In such an event, the particular molds selected should provide a jar depth accommodating a spaced range of plates, e.g., one mold used for 7 plates, one for 15 and one for 23. The insert sets would then be used for jar depths to provide the jar depths for the plate requirements interim to the adjacent-sized molds, e.g., for 9, 11 and 13 in the first mold series, and 17, 19 and 21 in the second series. However, whether one or more than one mold is used, the use of insert sets offers substantial advantage in comparison to the necessity of using a different mold set for each varying plate requirement due to the reduced capital costs and the simplified changeover.

Figure 4:
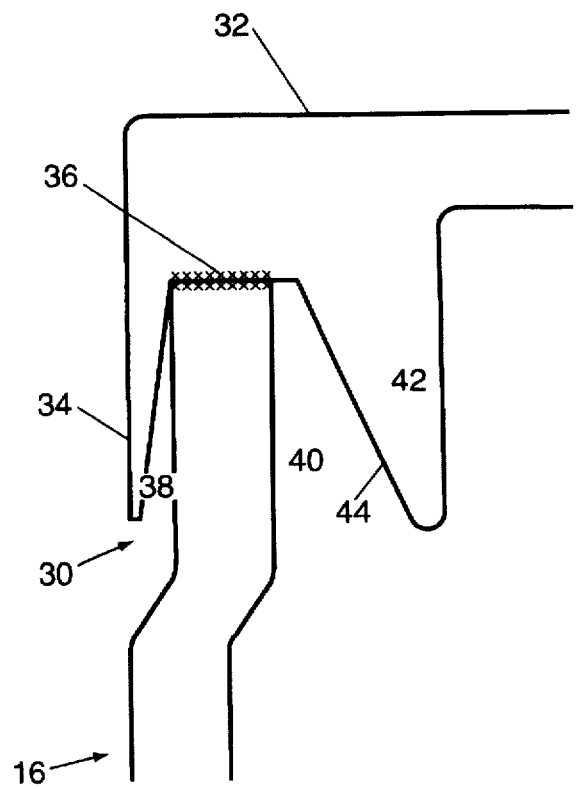
FIG. 4 is a partial side elevation view and showing a preferred cover and jar design which simplifies the heat sealing of the cover and jar.

Yet another aspect of the present invention includes, in a preferred embodiment, a cover and cell jar structure which avoids trimming of the bead resulting from joining the cover to the jar, and in a still more preferred embodiment, includes guide structure which facilitates moving the cover into proper alignment when using automated heat-seal equipment and the like. To this end, and as is shown in FIG. 4, jar 16 includes an inwardly stepped upper wall 30. Cover 32 is provided with a skirt 34 complementally dimensioned to provide an outer dimension identical to that of the jar 16. The heat seal bead, formed as indicated at 36, can still flow into open areas 38 and 40 without altering the desired uniformity of the outside dimensions. In this fashion, the trimming or the like to remove a heat seal bead which would otherwise impair the outer dimensions of the cell, thereby, for example, undesirably altering the desired fit in a steel tray, is eliminated.

A further aspect of this invention provides a cover guide that facilitates proper alignment when conventionally used heat sealing equipment is employed. To this end, cover guide 42 is provided, having angled surface 44 that cooperates with the upper wall surface of the jar 16 to insure that cover 32 is guided into proper alignment for the heat sealing operation.

As may be appreciated, as was the case with the indentations 12 and lifting ledges 14, since the jar precursor 10 is to be cut to make cell jars of various heights, use of this preferred cover-jar design requires proper location on what will become the upper wall of the cut cell jar. This may be achieved by molding into the jar precursors 10 the necessary stepped portion along the jar precursor height dimension, as is shown at 46 in FIG. 1.

However, if desired, all or some of the walls could be converted to the necessary configuration after being cut to the desired jar height. Suitable techniques for forming the necessary stepped upper walls in the cut cell jars include thermoforming or the like.

Figure 5:
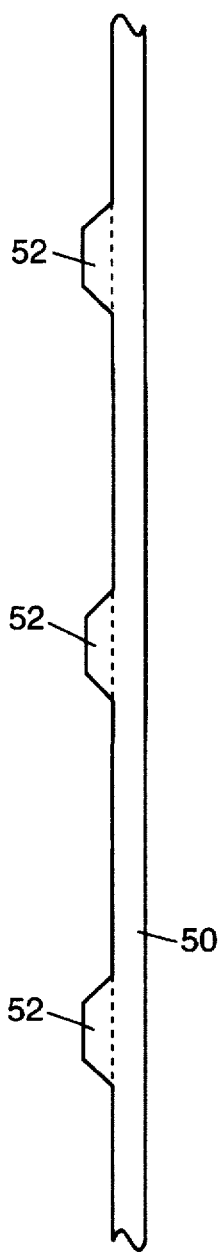
FIG. 5 is a partial cross-section of one wall of another embodiment of a jar precursor according to this invention and illustrating another method by which the cell jar shown in FIG. 4 can be made.

Still further, the respective areas of the jar precursor which would comprise the upper jar walls of each of the cut cell jars could be molded with thickened areas, machined out to provide the inwardly stepped upper walls after the jar precursor is cut to the desired cell jar height. To this end, as shown in FIG. 5, a jar wall 50 has spaced, thickened areas 52, dimensioned to provide after machining the desired stepped upper walls.

Figure 6:
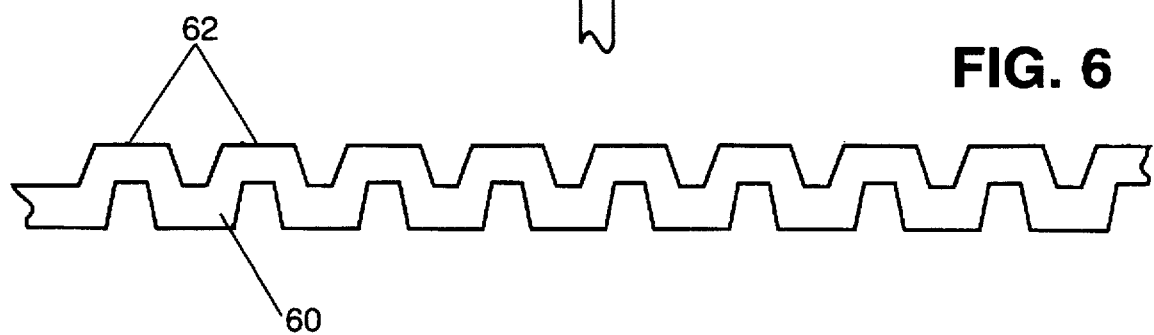
FIG. 6 is a partial cross-sectional view of one embodiment of a jar wall according to one embodiment of this invention, and showing an internal configuration suitable for maintaining the desired plate-to-plate spacing and providing satisfactory wall stiffness.

FIG. 6 shows a preferred design which provides both a wall stiffening ribbing as well as internal protuberances or ribbing. Thus, the walls include ribbing 60 and internal protuberances 62. The internal protuberances can be configured to achieve the desired plate spacing.

Figure 7:
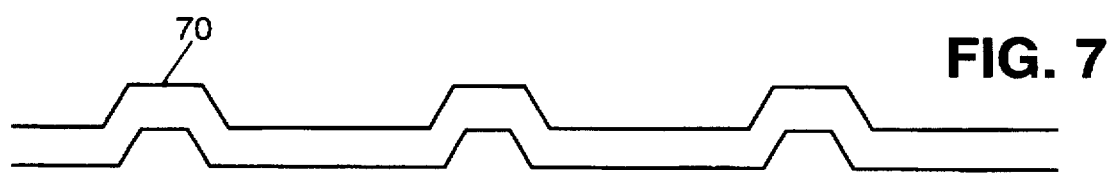
FIG. 7 is a partial cross-sectional view similar to FIG. 6 and illustrating a rib design suitable for plate-to-plate spacing, or for a bridge on the jar bottom.

FIG. 7 shows another aspect of the present invention. As is thus shown, the walls of the jar 16 have been blow molded in a ribbing pattern as shown at 70. In this fashion, proper plate spacing is provided.

The ribbing or bridge pattern illustrated herein is merely exemplary of a desirable pattern to satisfy the objectives as discussed herein. Any ribbing pattern may be utilized which is adequate to satisfy the objective described.

VRLA cells require uniform compression of the cell element in the jar so as to provide the desired electrical performance. Accordingly, any ribbing, lifting ledges, or other internally disposed protuberances (e.g., to provide a stepped upper wall for the cell jar) should be configured so as not to adversely affect the appropriate compression required. Indeed, many VRLA applications may dictate that the internal dimensions of the jar for the wall portions up to the plate height be uniform. In these applications, indentations would not be used; and the location of any lifting ledges would have to insure the desired uniformity, while requiring the stepped jar upper walls (at least on the walls in contact with the plates) to be formed after the jar precursor is cut to the desired cell jar height.

Figure 8:
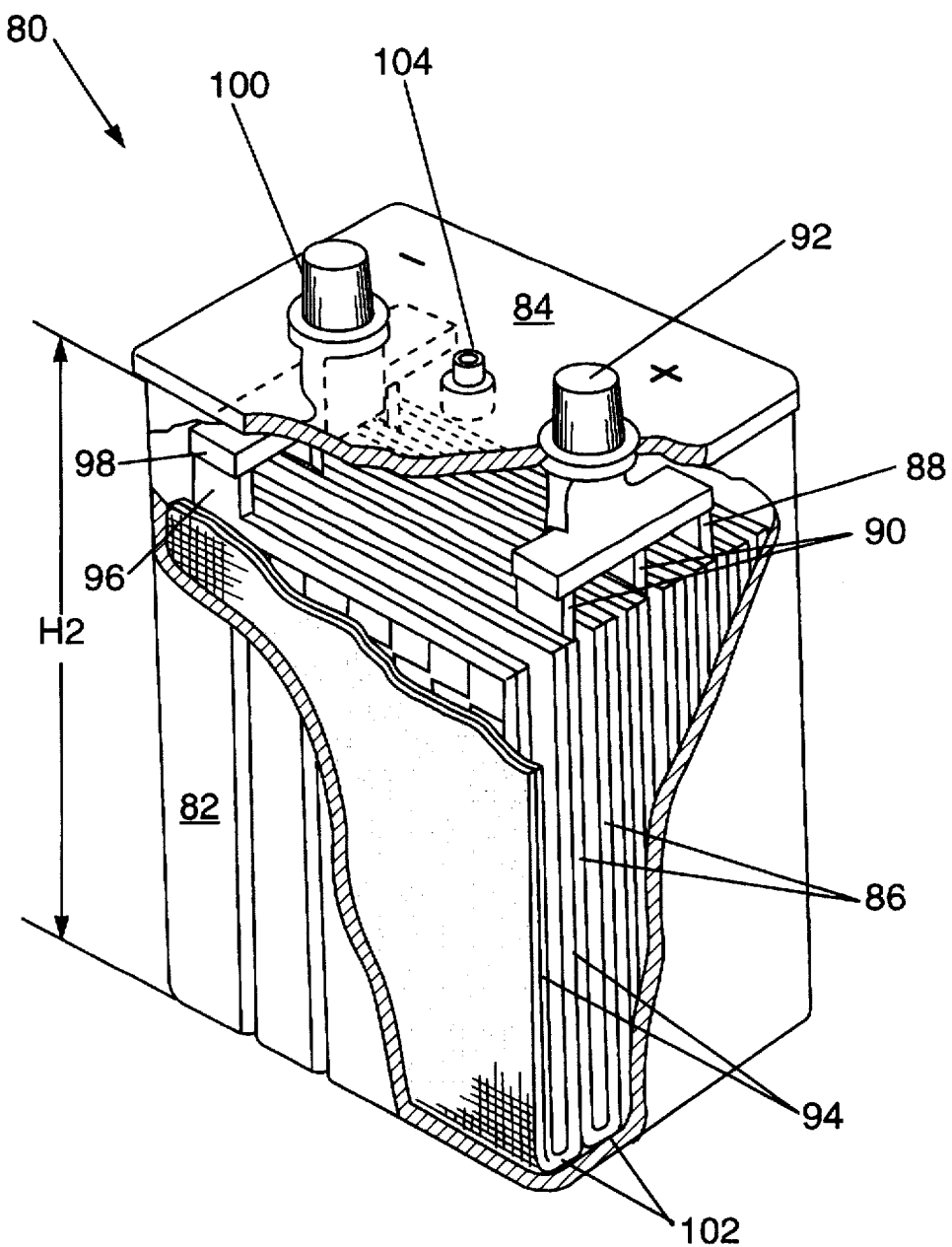
FIG. 8 is an isometric view of a lead-acid cell of the present invention, the cell jar being partially broken away to show the internal components.

FIG. 8 shows a lead-acid cell 80 according to the present invention. A blow-molded jar 82 has a cover 84 sealed thereto, as by heat sealing or the like. A series of positive plates 86 having lugs 88 are connected via strap 90 to positive terminal 92. Similarly, negative plates 94 are connected via lugs 96 to strap 98 and to the negative terminal 100. Separator 102, together with the porous plates 86 and 92, holds the electrolyte necessary for the desired electrical performance. For VRLA applications, a bunsen valve 104 is provided to maintain the desired internal pressure during operation of the cell, while providing venting in the event that the desired internal pressure is exceeded. All of the components of the cell 80 are known as are various materials of construction. The construction and materials of choice will be principally determined by the type of cell used. VRLA cells thus use, for expanded, thicker, more absorbent separators than employed in flooded electrolyte cells. Any configuration and materials desired may be used.

As is seen in FIG. 2, the jar 16 has corners (indicated at 18) which are essentially the same as the wall thickness about the jar. By thus maintaining the wall thickness essentially the same, as can be done by conventional blow molding technology, heat sealing or otherwise joining the cover to the jar can be conveniently carried out. This may require suitably altering the parison shape so that sufficient material will reach the corner portions of the jar precursor, such alterations being within the knowledge of those in this field. Blow molded jars can thus provide nearly the same internal dimensions as an injection molded jar.

The jar may be provided with rest-ups, if desired. FIG. 7 shows one example of a design suitable for such rest-ups or bridge. As is known, this is unnecessary in flooded electrolyte configurations where either enveloped separators are used, or where the plates are spaced by feet above the bottom of the jar.

Thus, as may be appreciated, the present invention provides the ability to deal with a variety of applications with minimum tooling while still providing cells having widely varying performance characteristics. Indeed, by utilizing the present invention, the capital and inventory requirements to satisfy a wide variety of industrial cell/battery applications have been significantly lessened. Even further, these advantages are achieved while obviating problems arising from approaches for making the necessary jars that have previously been used.

We claim:

1. A method for making a family of lead-acid cells requiring a cell jar with a constant width, a height varying from a maximum to a minimum to accommodate plates of varying height and a cell depth to accommodate a minimum to a maximum number of plates, which comprises selecting the jar width, blow molding a one piece jar precursor having said constant width and the cell depth selected and said maximum height, the jar precursor having a plurality of inwardly stepped portions, each of said stepped portions positioned to provide stepped upper walls of a cut jar of a different height, selecting the jar height required for the particular application and cutting the jar precursor to said jar height, assembling a cell element into said jar, and joining a cover to said jar.

2. The method of claim 1 wherein said jar has opposing walls having a ribbing pattern presenting uniform outer dimensions and decreased internal dimensions sufficient to provide a desired plate-to-plate spacing.

3. The method of claim 1 wherein said jar has opposing walls having a ribbing pattern sufficient to prevent bulging of the walls of the jar in use.

4. The method of claim 1 wherein said jar has walls having a uniform thickness and said cover is heat-sealed to said jar.

5. The method of claim 1 which includes providing a mold and a family of inserts yielding depths for the jar in which the number of plates can be varied from a minimum to a maximum and selecting the mold or a mold and inserts that yield the required depth for the blow molded jar precursor.

6. The method of claim 5 wherein the depth of the jar precursor is selected to provide a minimum number of plates and no insert is selected.

7. The method of claim 1 wherein the cover has a skirt, the outer dimension of the cover skirt and that of the jar, other than the stepped upper walls, being the same and the skirt providing an open area between the skirt and the upper wall of the jar adequate to accommodate a heat seal bead formed upon heat sealing the cover to the jar.

8. The method of claim 7 wherein the cover includes an angled cover guide assisting alignment of the cover in relationship to the upper walls of the jar for heat sealing the cover to the jar.

9. The method of claim 1 wherein said jar has walls having a ribbing pattern indented in at least two of the walls and horizontally positioned lifting ledges indented in said walls.

10. The method of claim 1 which includes blow molding a jar precursor having a series of a ribbing pattern indented in at least two of the walls and horizontally positioned lifting ledges indented in said walls, the respective series being spaced from each other along the height of the jar precursor and being located such that each series is adapted for use with a cell jar cut to a different height.

11. The method of claim 1 in which the jar precursor is blow molded to provide a plurality of inwardly stepped portions, each of said stepped portions positioned to provide stepped upper walls of a cut jar of a different height.

* * * * *